United States Patent [19]

Riefler et al.

[11] 4,178,963
[45] Dec. 18, 1979

[54] PILOT OPERATED SEQUENCING VALVE

[75] Inventors: Roger G. Riefler, Kinnelon; Alfred Rolfe, Pottersville, both of N.J.

[73] Assignee: Automatic Switch Company, Florham Park, N.J.

[21] Appl. No.: 896,257

[22] Filed: Apr. 14, 1978

[51] Int. Cl.² ............................................. F16K 11/02
[52] U.S. Cl. ........................ 137/624.18; 137/625.11; 137/625.41; 137/625.46; 251/230
[58] Field of Search .......... 137/624.11, 624.2, 624.18, 137/625.11, 625.46, 625.41; 251/230

[56] References Cited

U.S. PATENT DOCUMENTS

| | | | |
|---|---|---|---|
| 3,066,688 | 12/1962 | Young | 251/230 X |
| 3,136,335 | 6/1964 | Beech | 251/230 X |
| 3,345,915 | 10/1967 | Dotto | 251/230 X |
| 3,369,565 | 2/1968 | Haggard | 137/625.11 |
| 3,924,652 | 12/1975 | Kah | 137/624.18 |

*Primary Examiner*—Alan Cohan
*Attorney, Agent, or Firm*—Alan H. Levine

[57] ABSTRACT

A valve, for sequentially operating a plurality of main valves, including a valve body having a plurality of inlet ports for connection to a plurality of main valves, respectively, and a chamber for receiving high pressure fluid from the inlet ports. A pilot valve, which may be operated by a solenoid energized and deenergized periodically by an electric timer, relieves pressure in the chamber each time it opens and permits pressure to build up in the chamber each time it closes. A sequencing valve member permits only one inlet port to be in communication with the chamber each time the pilot valve is opened, so as to relieve pressure in only the main valve connected to that one inlet port. The sequencing valve member may be an apertured rotatable disk slidably engaging valve seats surrounding the inlet ports. An operator responds to successive closings of the pilot valve for indexing the sequencing valve member so that each inlet port in turn communicates with the chamber. The operator may include a piston-cylinder device, the cylinder communicating with the chamber, and a pawl and ratchet mechanism between the piston rod and the sequencing valve member. The aperture in the sequencing valve disk may be large enough so that at all times at least one of the inlet ports communicates with the chamber. An auxiliary port may be provided connected to a source of high pressure fluid, and an auxiliary valve pressurizes the chamber when it opens and cuts off pressure to the chamber from the auxiliary port when it closes, the auxiliary valve being open only when the pilot port is closed. In this way, the sequencing valve member operates even if one or more of the inlet ports is plugged.

14 Claims, 8 Drawing Figures

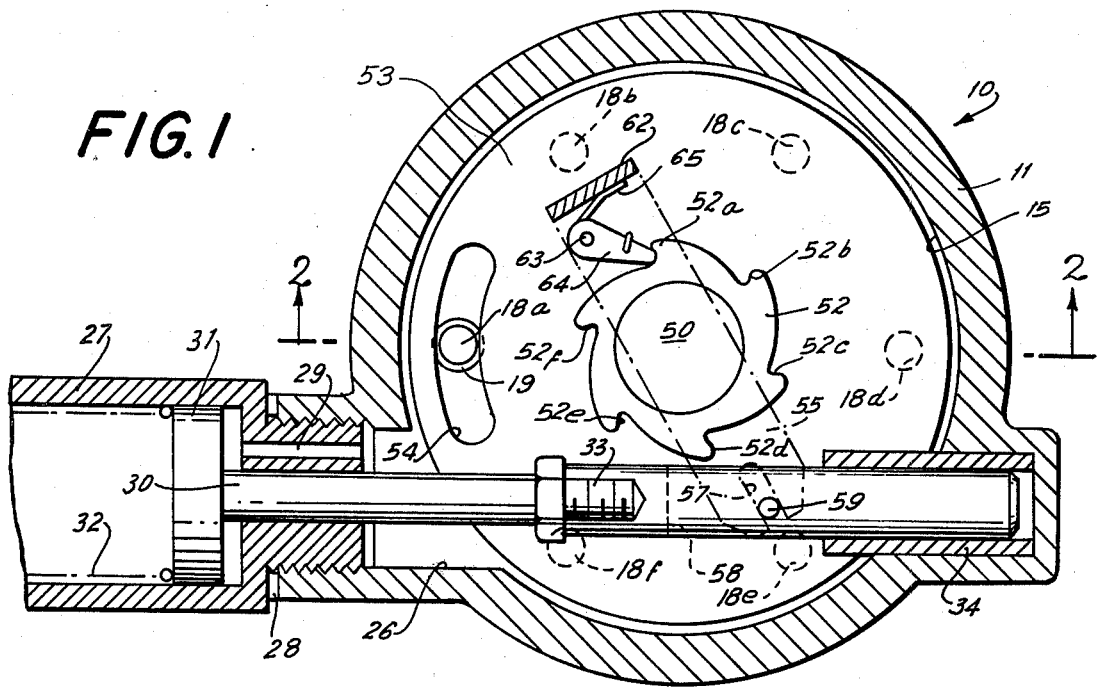
FIG. 1
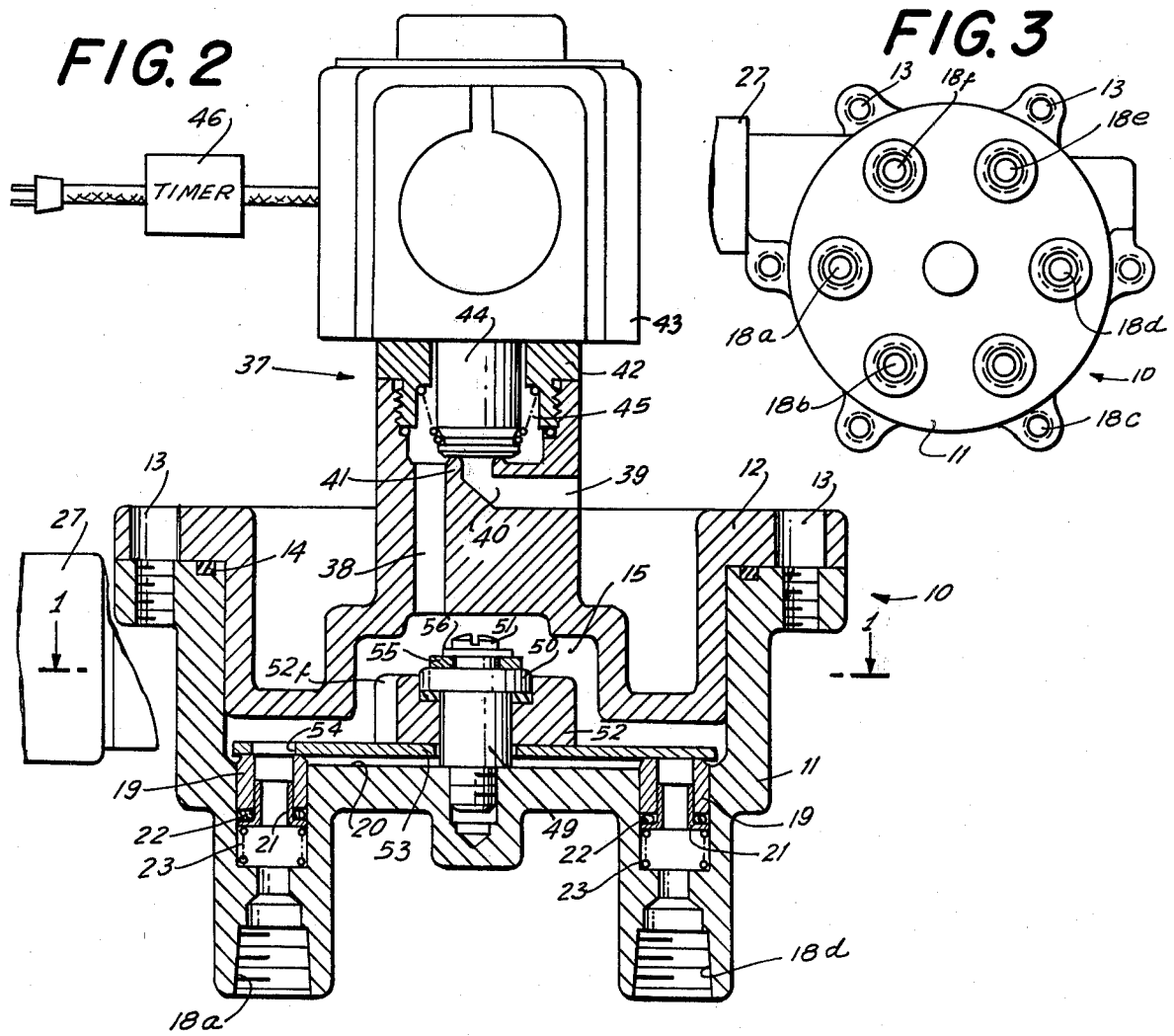
FIG. 2
FIG. 3

PILOT OPERATED SEQUENCING VALVE

This invention relates to pilot operated valves, and more particularly to such a valve for use with an arrangement wherein a series of main valves are to be operated in sequence.

It is an object of the invention to provide a pilot operated valve having a plurality of inlet ports, all but one of the inlet ports being closed in each stable condition of the valve, and the inlet ports being opened in sequence upon successive operations of the valve.

It is another object of the invention to provide such a valve wherein only the open one of the inlet ports communicates with a low pressure region each time the valve is operated.

A practical application of the valve of this invention is in apparatus for shaking air filter bags of dust collector equipment. Such bags require a large volume, rapidly applied, blast of air to effectively shake loose the dust adhering to them. To provide sufficient compressed air to shake all the bags of such equipment simultaneously would require very large air compressing and storage facilities. Therefore, for reasons of economy, it is preferable to shake each bag, or small groups of bags, individually. In the past, filter bag shaking apparatus has required a relatively complex and expensive arrangement of individual pairs of pilot and main valves and electrical or pneumatic circuit connections to provide sequential shaking. The valve of the present invention makes it possible to assemble a much simpler arrangement, requiring only a simple electrical connection, a simple timer, and a single sequencing pilot valve, which is just as effective for providing air blasts to the filter bags in sequence.

The present valve is useful not only as part of a filter bag shaking apparatus, but in any situation requiring sequential operation of a series of valves.

Additional features and advantages of the invention will be apparent from the following description in which reference is made to the accompanying drawings:

In the drawings:

FIG. 1 is a cross-sectional view of a pilot operated sequencing valve according to the present invention, taken along line 1—1 of FIG. 2;

FIG. 2 is a cross-sectional view of the valve taken along line 2—2 of FIG. 1;

FIG. 3 is a bottom view of the valve;

Figure 4:
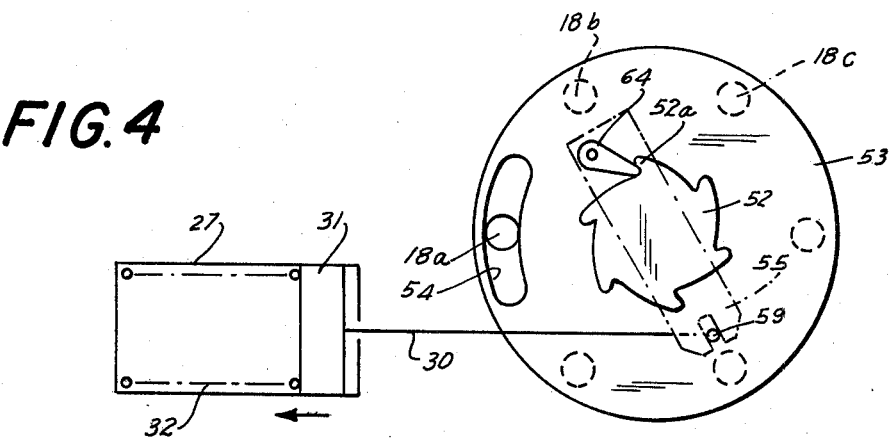
FIGS. 4–7 are schematic views showing a sequence of operation of the valve.

The sequencing valve chosen to illustrate the present invention, and shown in FIGS. 1–7, includes a valve body 10 comprising a lower body portion 11 and a bonnet 12 joined together by suitable fasteners such as screws 13. An O-ring seal 14 provides a fluid-tight seal between the body portion 11 and bonnet 12, the latter parts being formed to define a chamber 15 between them.

Body portion 11 is provided with a plurality of inlet ports 18a–18f which may be internally threaded at their lower ends, as indicated in FIG. 2, for connection to conduits (not shown) capable of carrying pressurized fluid. In the present example, six inlet ports 18a–18f are shown arranged equidistantly spaced apart in a circular pattern (FIG. 3). The upper end of each inlet port terminates in the floor 20 of chamber 15, so that the inlet ports can communicate with the chamber, and each inlet port upper end snugly accommodates an annular valve seat 19. Each valve seat 19, which may be formed of a suitable resilient material, such as Teflon (tetrafluoroethylene), projects slightly above the floor 20 of chamber 15. A rigid grommet 21 fits tightly within the lower end of each valve seat 19, and an O-ring seal 22 is located between the lower edge of the seat and the flange of the grommet to prevent fluid from seeping between the external surface of seat 19 and the wall of the inlet port into chamber 15. A compression spring 23 constantly biases each seat 19 upwardly, for a reason which will be mentioned below.

Body portion 11 is formed with an internally threaded bore 26 (FIG. 1), communicating with chamber 15, by means of which one end of a cylinder 27 is secured to the body. A seal 28 insures a fluid tight connection between the cylinder and body. Cylinder 27 is completely closed, except that at its end connected to body portion 11 it is provided with a passageway 29 establishing constant communication between the interior of the cylinder and chamber 15, and with a bore slidably accommodating a piston rod 30. At one end, piston rod 30 is fixed to a piston 31 slidable axially within cylinder 27. The piston is constantly biased toward the right in FIGS. 1 and 4–7, by a compression spring 32. Piston rod 30 is made in two parts screw threaded together at 33 so that its length may be adjusted. The end of rod 30 opposite piston 31 is slidably accommodated within a cylindrical bearing 34 carried by body portion 11.

The sequencing valve includes a pilot valve 37 (FIG. 2) formed in part in bonnet 12. The pilot valve includes an inlet port 38, an outlet port 39, and an orifice 40 between the two ports surrounded by a valve seat 41. Inlet port 38 communicates with chamber 15, and outlet port 39 opens into the atmosphere, where the fluid involved is air, or into a low pressure reservoir where the fluid is a liquid or a gas requiring containment. Bonnet 12 is formed with an internally threaded bore which threadably accommodates the lower end of a cylindrical core tube 42. Surrounding the core tube 42 is an electrical solenoid 43, and slidable axially within the core tube is a solenoid armature 44. At its lower end, armature 44 carries a resilient valve member cooperable with valve seat 41. When solenoid 43 is deenergized, a compression spring 45 maintains armature 44 in its lowermost position, shown in FIG. 2, wherein the valve member at the lower end of the armature engages seat 41 and closes orifice 40. When solenoid 43 is energized, armature 44 is lifted to open orifice 40 so that chamber 15 communicates with the low pressure region into which port 39 open. Preferably, an electric timer 46 is employed to periodically energize and deenergize solenoid 43.

Projecting perpendicularly from floor 20 of chamber 15 is a bolt 49 having a reduced diameter threaded lower end screwed into a threaded bore in floor 20. At its upper end, bolt 49 is formed with an enlarged head 50 from which a reduced diameter pin 51 projects upwardly. Arranged for rotation about bolt 49 is a ratchet wheel 52 having a plurality of teeth, in this case six teeth 52a–52f. Fixed to ratchet wheel 52, and hence rotatable with it is a circular plate 53 having a single arcuate aperture 54. Aperture 54 is radially spaced from bolt 49 a distance such that the circular path through which the aperture moves as plate 53 rotates coincides with the circular pattern of inlet ports 18a–18f. Valve seats 19 are urged into fluid tight engagement with the lower face of plate 53 by springs 23, but the contact pressure is not sufficient to prevent rotation of the plate. Hence, plate 53 is in tight slidable engagement with the upper ends of seats 19. In this way, plate 53 closes all the inlet ports 18a–18f except for the one with which aperture 54 happens to be in registry, e.g., inlet port 18a in FIGS. 1 and 2.

A lever 55 rests upon head 50 of bolt 49, and is pivotable about pin 51. A retaining ring 56 (FIG. 2) prevents disengagement of the lever and pin. One end of lever 55 is provided with a short longitudinally extending slot 57 (FIG. 1), and that end of the lever fits movably within a longitudinal slot 58 in piston rod 30; slot 58 extends from the right end of rod 30 in FIG. 1 almost to the threaded connection 33 between the two parts of the piston rod. A pin 59 extends across slot 58 and is slidably accommodated within slot 57 in lever 55. It will be appreciated, therefore, that reciprocation of piston rod 30 causes oscillation of lever 55 due to the interengagement of pin 59 and slot 57.

The other end of lever 55 is bent through 90° to define a downwardly extending lip 62 (FIG. 1). Pivotally mounted on the lower face of lever 55, by pivot pin 63, is a pawl 64. A coil spring 65 surrounds pin 63; one end of the spring bears against lip 62 and the other end engages pawl 64, thereby constantly urging pawl 64 in a clockwise direction in FIGS. 1 and 4–7. Pawl 64 is located so that its free end can engage each tooth 52a–52f of ratchet wheel 52. In FIG. 1, the pawl is shown engaging tooth 52a.

Figure 8:
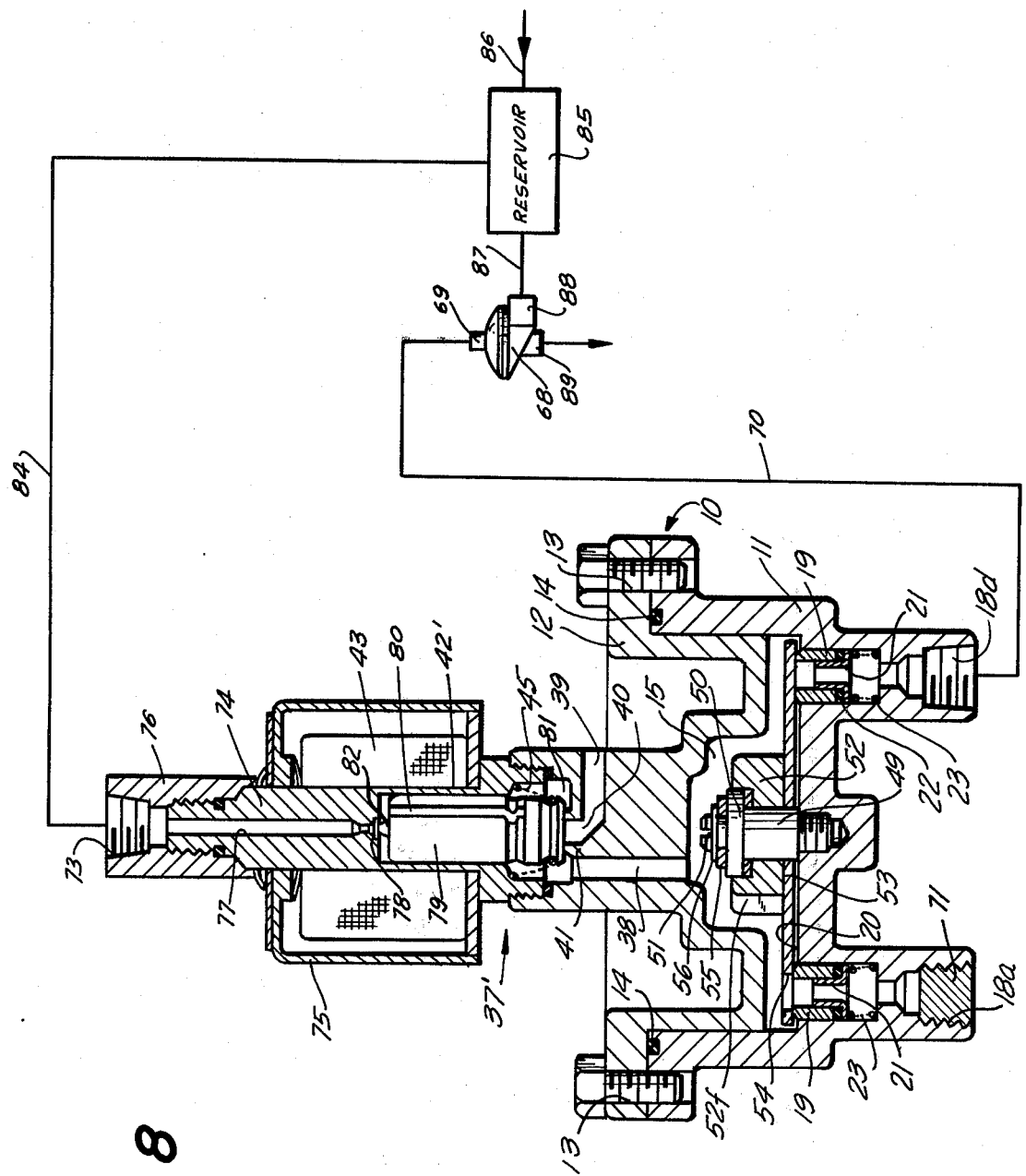
FIG. 8 is a view similar to FIG. 2 of an alternative embodiment of the valve of this invention, together with a schematic showing of a main valve and pressurized air tank.

The sequencing valve is used by connecting each of the inlet ports 18a–18f to the pilot port of a main valve. FIG. 8 shows a main valve 68, the pilot port 69 of which is connected to an inlet port 18d of the sequencing valve by a conduit 70. In the present example, six such main valves will be involved connected to the six inlet ports, respectively. Each main valve may be of the conventional type wherein the pilot port communicates with a chamber above the main valve member. When the pilot port is closed, the chamber fills with high pressure fluid, through a bleed passageway connecting the valve inlet and the chamber, and the main valve closes. When the pilot port is open, the pressure in the chamber is relieved and the main valve opens. Closing of each inlet port 18a–18f, by plate 53, effectively closes the pilot port of the main valve with which it is associated and hence that main valve is closed. Opening of each inlet port 18a–18f, by registry with aperture 54 in plate 53, permits communication between the pilot port of the main valve with which it is associated and chamber 15. If pilot valve 37 is open, the chamber of that main valve communicates with a low pressure region. When the pilot valve closes, high pressure fluid flowing into the chamber of the main valve also fills chamber 15 of the sequencing valve.

Assume that the parts are in the position shown in FIGS. 1, 2, and 4, except that through timer 46 solenoid 43 is energized so that armature 44 is lifted and pilot valve 37 is open. The pressure in chamber 15 is low, since it communicates with the atmosphere through port 38, orifice 40, and port 39. Furthermore, the pressure is low in the chamber of the main valve associated with inlet port 18a, since it communicates with chamber 15 through port 18a, and aperture 54 in plate 53. Hence, that main valve is open; the other five main valves are closed, however, since inlet ports 18b–18f are closed by plate 53. Pressure is also low in cylinder 27 since it communicates with chamber 15 through passageway 29, and hence spring 32 has moved piston 31 to its rightwardmost position (FIGS. 1 and 4). Pawl 64 is in engagement with ratchet tooth 52a.

Timer 46 now causes deenergization of solenoid 43, and pilot valve 37 closes, as shown in FIG. 2. The high pressure fluid flowing into the chamber of the main valve not only fills that chamber, but also flows into and fills chamber 15. Since the fluid cannot escape through the pilot valve, the pressure in the main valve chamber rises to close the main valve, and the pressure in chamber 15 also rises. The high pressure fluid flows through passageway 29 into cylinder 27 and moves piston 31 toward the left (FIG. 5) against the force of spring 32. As a result, piston rod 30 also moves toward the left, causing pivotal movement of lever 55 in a clockwise direction. Due to the interengagement of pawl 64 with tooth 52a, ratchet wheel 52 turns clockwise carrying with it plate 53. Thus, apeture 54 moves out of registry with inlet port 18a and toward inlet port 18b.

Figure 5:
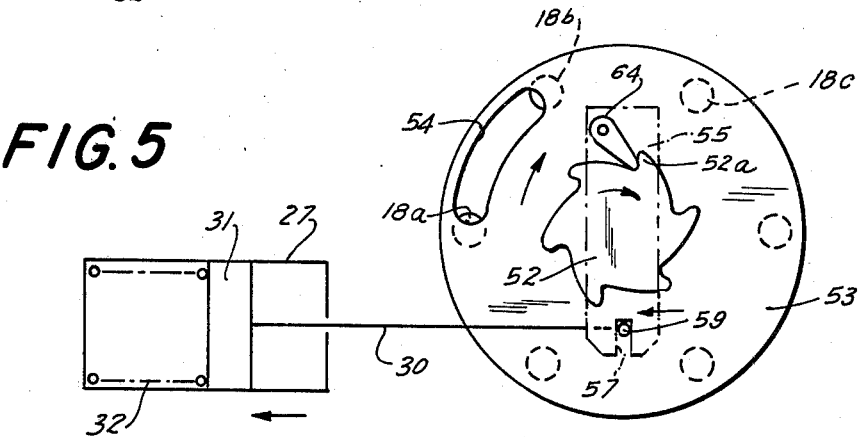
Figure 6:
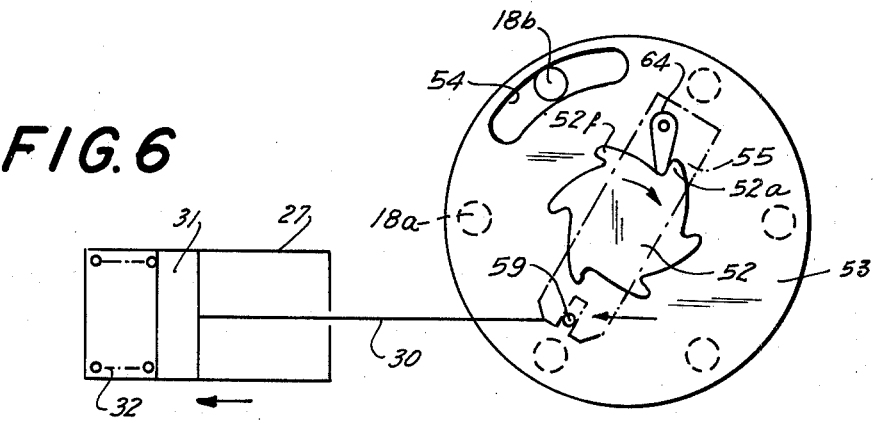

It will be seen in FIG. 5 that the length of aperture 54 is greater than the shortest distance between each two successive inlet ports, e.g., ports 18a and 18b. Consequently, inlet port 18b opens at least partially before inlet port 18a is closed completely, thereby assuring a continued flow of high pressure fluid from the main valves to chamber 15. Without this continuous flow, piston 31 would stop moving before reaching its leftwardmost position, as a result of which plate 53 would stop moving with aperture 54 located between two successive inlet ports. In such a position, all the inlet ports would be closed by plate 53 and the sequencing valve would stop functioning.

Figure 7:
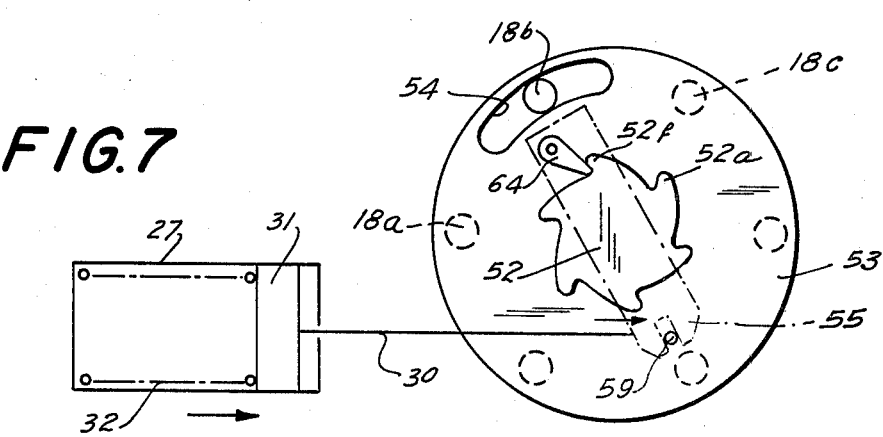

When piston 31 reaches its leftwardmost position (FIG. 6), aperture 54 is centered over inlet port 18b, thereby opening that port, and inlet port 18a has been closed. Upon the next energization of solenoid 43, pilot valve 37 opens and relieves the pressure in chamber 15. As a result, the pressure is also relieved in the chamber of the main valve associated with inlet port 18b, and hence that main valve opens. All the other main valves, however, remain closed. In addition, the pressure is relieved in cylinder 27, and hence spring 32 moves piston 31 back to its rightwardmost position (FIG. 7). Piston rod 30 also moves toward the right causing counterclockwise movement of lever 55. In consequence, pawl 64 moves out of engagement with ratchet tooth 52a and into engagement with tooth 52f. When the pilot valve 37 closes again, the cycle described above is repeated, i.e., plate 53 is indexed to its next position, wherein aperture 54 becomes centered over inlet port 18c. Upon the following closure of the pilot valve, pawl 64 engages the next successive ratchet tooth 52e, preparatory to indexing plate 53 again.

It will be appreciated therefore that each time pilot valve 37 opens, a different one of the main valves, in sequence, is opened. In this connection, it may be pointed out that, instead of using timer 46, solenoid 43 can be energized and deenergized manually, or in any other conventional manner. Alternatively, the timer could be built into the solenoid housing.

The sequencing valve described above requires that a main valve be connected to each of its inlet ports 18a–18f, otherwise the sequencing valve will stop operating when aperture 54 in plate 53 registers with an inlet port not connected to a main valve. It may happen, however, that fewer than six main valves are to be operated in sequence. Under such circumstances, the embodiment of the invention shown in FIG. 8 can be use. In FIG. 8, inlet port 18a is shown closed by a fluid tight plug 71, since no main valve is connected to this inlet port.

The parts of the sequencing valve of FIG. 8 which are the same as those parts shown in FIG. 2 bear the same reference numerals in both figures. In FIG. 2, pilot valve 37 is shown as a two-way valve having one inlet port 38 and one outlet port 39. In FIG. 8, pilot valve 37' is a three-way valve having inlet port 38, outlet port 39, and an auxiliary inlet port 73. Solenoid 43 surrounds core tube 42' and a stationary armature, or plug nut, 74 is fixed within the upper portion of the tube (the tube and plug nut being shown schematically as one piece), a protective housing 75 surrounding the solenoid. The upper end of plug nut 74 projects beyond the core tube and is externally threaded. An internally threaded sleeve 76 engages the upper end of the plug nut and holds solenoid housing 75 in place over core tube 42'. Sleeve 76 is also formed with auxiliary inlet port 73.

Plug nut 74 has a central longitudinal bore 77 terminating at its lower end in an auxiliary valve seat 78 which opens into the lower portion of core tube 42' containing movable armature 79. The armature has at least one longitudinal groove 80 in its surface, defining a fluid passageway or passageways between the armature and core tube 42'. At its lower end, groove 80 opens into a chamber 81 containing the pilot valve seat and pilot valve member carried at the lower end of armature 79. At its upper end, armature 79 carries an auxiliary valve member 82 adapted to engage auxiliary valve seat 78. Armature 79 has two alternative positions: when solenoid 43 is deenergized, the pilot valve is closed and the auxiliary valve is open, as shown in FIG. 8; when solenoid 43 is energized, armature 79 is raised opening the pilot valve and closing the auxiliary valve.

Auxiliary inlet port 73 is connected by a conduit 84 to a high pressure fluid reservoir 85 receiving compressed fluid at 86 from a suitable source such as a pump (not shown). Reservoir 85 may be the same reservoir which supplies high pressure fluid through conduit 87 to the inlet 88 of each main valve 68. When each main valve opens, a high pressure blast exits through main valve outlet 89. When solenoid 43 is deenergized, high pressure fluid flows from reservoir 85 through conduit 84 to auxiliary inlet port 73; from the port, the fluid flows through bore 77, open auxiliary valve 78, 82, and groove 80 into chamber 81. From chamber 81, the fluid flows through port 38 into chamber 15. As a result, even if aperture 54 in plate 53 is in registry with plugged inlet port 18a, so that no high pressure fluid reaches chamber 15 through inlet port 18a, chamber 15 nevertheless is filled with high pressure fluid through the auxiliary valve. The high pressure fluid flows through passageway 29 (FIG. 1) to operate piston 31 as described above. When solenoid 43 is energized, auxiliary valve member 82 seats against auxiliary valve seat 78, thereby closing off flow of high pressure fluid to chamber 15. At the same time, the pilot valve opens relieving the pressure in chamber 15.

If desired, the sequencing valve shown in FIG. 8 could be used even if all the inlet ports 18a–18f are connected to main valves. In such a case, chamber 15 will fill with high pressure fluid more rapidly after solenoid 43 is deenergized, since it receives fluid from both the inlet port with which aperture 54 is in registry and also through the open auxiliary valve 78, 82, and hence the sequencing valve will operate more rapidly.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A valve for sequentially operating a plurality of main valves, comprising:
    (a) a valve body having a plurality of inlet ports for connection to a plurality of main valves, respectively,
    (b) a chamber within said valve body for receiving high pressure fluid from said inlet ports,
    (c) a pilot valve for selectively permitting or preventing communication between said chamber and a low pressure region, so that when said pilot valve is open the pressure in said chamber is relieved and when said pilot valve is closed the pressure in said chamber increases,
    (d) sequencing valve means including a movable member for permitting only one of said inlet ports to be in communication with said chamber each time said pilot valve is opened, so as to relieve pressure in only the main valve connected to that one inlet port,
    (e) operator means for indexing said movable member from one stationary position to another upon each closure of said pilot valve and resulting increase in pressure in said chamber, and
    (f) said movable member having an aperture through which a different one of said inlet ports communicates with said chamber in each stationary position of said movable member, said inlet ports being spaced apart along the path of movement of said aperture, and the length of said aperture being greater than the shortest distance between each two successive inlet ports measured along the path of movement of said aperature, so that at all times at least one of said inlet ports communicates with said chamber through said aperture.

2. A valve as defined in claim 1 including means for actuating said pilot valve at regular intervals.

3. A valve as defined in claim 2 wherein said actuating means includes an electrical solenoid, and an electric timer for periodically energizing and deenergizing said solenoid.

4. A valve as defined in claim 1 wherein said pilot valve includes an inlet port communicating with said chamber, an outlet port communicating with a low pressure region, an orifice between said ports surrounded by a valve seat, and a pilot valve member movable into and out of engagement with said valve seat.

5. A valve as defined in claim 1 wherein said inlet ports are equidistantly spaced apart, and said operator means indexes said movable member through a distance equal to the spacing between said inlet ports in response to each closing of said pilot valve.

6. A valve as defined in claim 1 wherein said movable member is rotatable and said inlet ports are arranged in a circular pattern.

7. A valve as defined in claim 1 wherein each of said inlet ports terminates at a valve seat within said chamber, and said movable member is a plate within said chamber slidably engaging said valve seats to close said inlet ports, said plate having an aperture which registers with a different one of said valve seats in each of its successive stationary positions.

8. A valve as defined in claim 1 wherein said operator means includes a piston-cylinder device responsive to pressure changes in said chamber for moving said member.

9. A valve as defined in claim 8 wherein said piston-cylinder device includes a cylinder communicating with said chamber, a piston movable in one direction in said cylinder upon the build-up of high pressure in said chamber and movable in the opposite direction upon relief of pressure in said chamber, and means for transmitting movement of said piston to said movable member.

10. A valve as defined in claim 9 wherein said transmitting means includes a cooperable ratchet and pawl arrangement, the ratchet being movable with one of said piston and movable member and the pawl being movable with the other of said piston and movable member 11. A valve for sequentially operating a plurality of main valves, comprising:
  (a) a valve body having a plurality of inlet ports for connection to a plurality of main valves, respectively,
  (b) a chamber within said valve body for receiving high pressure fluid from said inlet ports,
  (c) a pilot valve for selectively permitting or preventing communication between said chamber and a low pressure region, so that when said pilot valve is open the pressure in said chamber is relieved and when said pilot valve is closed the pressure in said chamber increases,
  (d) sequencing valve means including a movable member for permitting only one of said inlet ports to be in communication with said chamber each time said pilot valve is opened, so as to relieve pressure in only the main valve connected to that one inlet port,
  (e) operator means for indexing said movable member from one stationary position to another upon each closure of said pilot valve and resulting increase in pressure in said chamber, and
  (f) an auxiliary port uncontrolled by said sequencing valve means for connecting said chamber to a source of high pressure fluid to insure an increase in pressure in said chamber each time said pilot valve closes.

12. A valve as defined in claim 11 wherein at least one of said inlet ports is plugged and not connected to a main valve.

13. A valve as defined in claim 11 wherein said pilot valve is a three-way valve having two inlet ports and an outlet port, one of said inlet ports being said auxiliary port.

14. A valve as defined in claim 11 wherein said pilot valve includes an orifice surrounded by a valve seat, said auxiliary valve means includes an orifice surrounded by a valve seat, said valve seats being spaced apart, and a valve member movable between said valve seats to alternatively engage said valve seats.

* * * * *